United States Patent
Ao et al.

(10) Patent No.: US 7,581,453 B2
(45) Date of Patent: Sep. 1, 2009

(54) ULTRASONIC FLOW METER SYSTEM

(75) Inventors: Xiaolei Shirley Ao, Lexington, MA (US); John Albert Umina, Waltham, MA (US); Edward R. Furlong, Beverly, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/617,817

(22) Filed: Dec. 29, 2006

(65) Prior Publication Data

US 2008/0156107 A1 Jul. 3, 2008

(51) Int. Cl.
*G01F 1/66* (2006.01)
(52) U.S. Cl. .................................. 73/861.27
(58) Field of Classification Search . 73/861.25–861.29, 73/861.31
See application file for complete search history.

(56) References Cited

U.S. PATENT DOCUMENTS

| | | | | |
|---|---|---|---|---|
| 3,914,999 | A * | 10/1975 | Grandchamp | 73/861.25 |
| 4,317,178 | A * | 2/1982 | Head | 702/47 |
| 4,787,252 | A | 11/1988 | Jacobson et al. | |
| 5,437,194 | A * | 8/1995 | Lynnworth | 73/861.27 |
| 5,705,753 | A * | 1/1998 | Hastings et al. | 73/861.28 |
| 6,067,861 | A | 5/2000 | Shekarriz et al. | |
| 6,460,419 | B2 * | 10/2002 | Su | 73/861.31 |
| 6,474,174 | B2 * | 11/2002 | Su | 73/861.31 |
| 6,732,595 | B2 * | 5/2004 | Lynnworth | 73/861.27 |
| 6,745,632 | B1 * | 6/2004 | Dryer et al. | 73/597 |
| 7,096,135 | B2 * | 8/2006 | Ao et al. | 702/79 |
| 7,152,490 | B1 * | 12/2006 | Freund et al. | 73/861.27 |
| 2002/0050176 | A1 * | 5/2002 | Su | 73/861.31 |
| 2002/0189367 | A1 * | 12/2002 | Gomm et al. | 73/861.23 |
| 2004/0006436 | A1 | 1/2004 | Morgan | |
| 2004/0011141 | A1 * | 1/2004 | Lynnworth | 73/861.27 |

* cited by examiner

*Primary Examiner*—Lisa M Caputo
*Assistant Examiner*—Freddie Kirkland, III
(74) *Attorney, Agent, or Firm*—GE Global Patent Operation

(57) ABSTRACT

An ultrasonic flow meter system includes transducers arranged with respect to a conduit to define at least one chordal path through fluid flowing in the conduit, and at least one transmitting transducer and receiving transducer pair on the chordal path for generating a transit time signal. At least one receiving transducer is positioned to receive scattered energy to generate a range gated Doppler signal. The system further includes a processing subsystem for exciting the at least one transmitting transducer. The processing subsystem is responsive to the transit time signal and the range gated Doppler signal and configured to generate a velocity profile and a mean velocity of the fluid in the conduit.

32 Claims, 6 Drawing Sheets

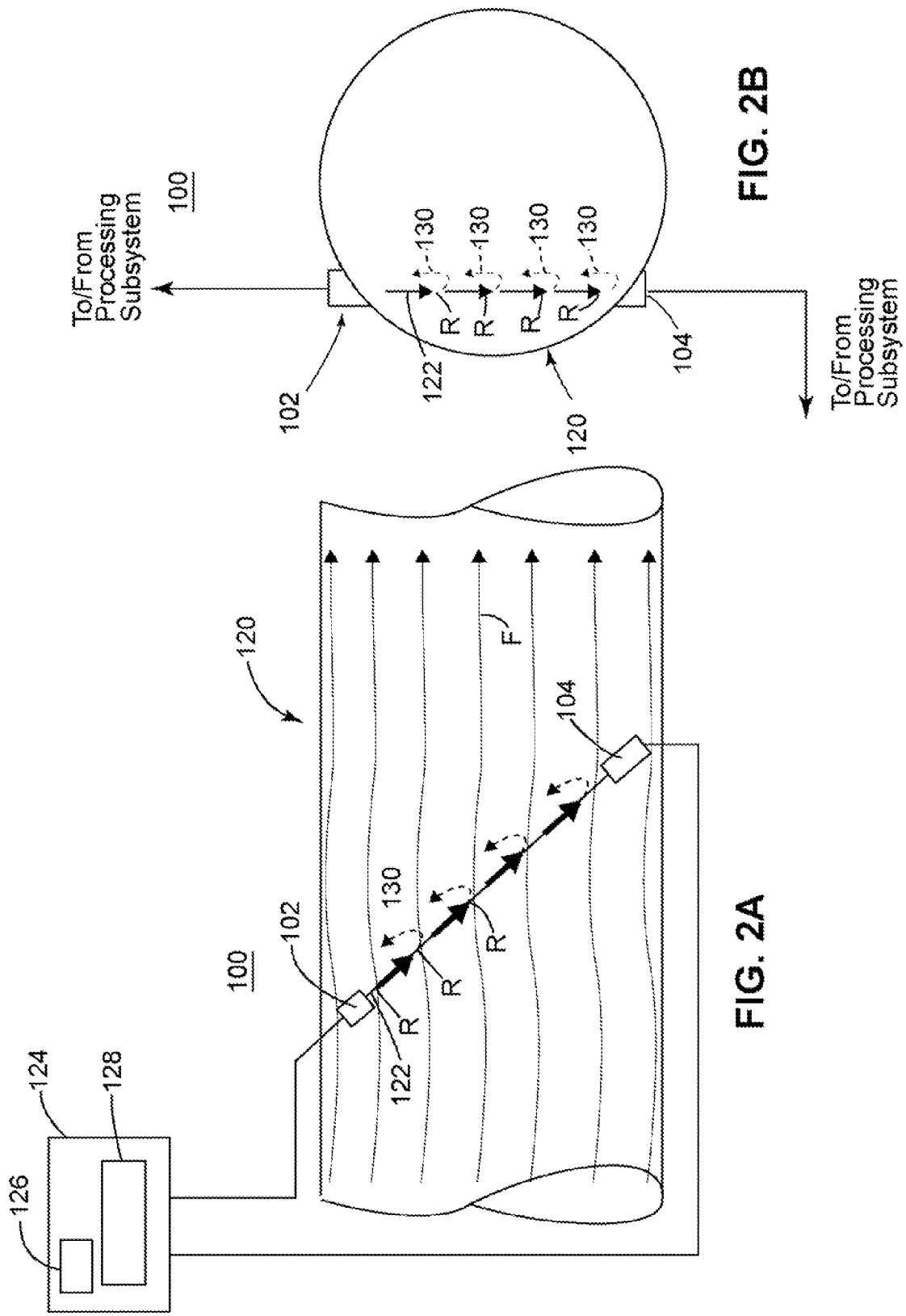

ULTRASONIC FLOW METER SYSTEM

FIELD OF THE INVENTION

This subject invention relates to ultrasonic flow meter technology.

BACKGROUND OF THE INVENTION

Ultrasonic transducers are used to measure the flow rate of a flow in a conduit. Transit time flow metering is a common ultrasonic method to measure the mean pipe flow rate. One transducer, when excited or energized by an electronic controller, emits a sound wave through the flow which is detected by another transducer. The controller alternates between the receiver and transmitter back and forth to receive signals traveling along and against the direction of flow. The transit times of the wave are then used to calculate speed of sound of the fluid and further calculate the flow rate by using the speed of sound, path length, the transit times, and conduit dimension data.

The flow velocity has a radial distribution described by its flow profile, which is a function of the Reynolds number for the flow medium, pipe roughness, and the conduit configuration. Existing one-path ultrasonic flow meters measure volumetric pipe flow Q by multiplying the conduit cross-sectional area S times the mean area flow velocity V and using an analytical or empirical profile correction factor. However, the analytical or empirical profile correction factors are often flow rate dependent and invalid if the flow profile is not symmetrical, accuracy is thus comprised.

Also, if the fluid properties are unknown, or if the conditions upstream of the transducers are complex, a severely distorted flow profile can result. Thus, multiple transducer pairs are used to more accurately extrapolate the mean pipe flow rate, and four or more transducer pairs defining four or more paths through the flow are often used. Chordal paths (paths not on a diameter or through the conduit center) are typically used in association with wetted transducers which are in contact with the conduit flow.

Each additional path through the flow requires an additional transducer pair, typically adding to the cost and complexity of the flow meter. Also, a high number of paths require a high number of ports in the flow meter body, which could cause flow profile disturbances. Flush mounting the transducer ports can reduce such disturbances, but ultrasonic signal strength is reduced. Therefore, using numerous wetted transducers can result in less accurate measurements.

In one type of system, the flow profile can be ascertained by a range gated Doppler method. Energy is scattered by particles, bubbles or any other inhomogeneities, and the energy received by the transducers has different frequency components from the incident signals, and the differences are analyzed to calculate velocities of the scatterers. See e.g. U.S. Pat. No. 4,787,252 incorporated herein by this reference. According to this patent, each clamp-on transducer pair is located on a diameter (as clamp-on transducers must be) and each acts as a transmitter and then a receiver of energy scattered back to itself. Such transducers, however, can be difficult to engineer for industrial applications.

It is also known to combine transit time and range gated Doppler techniques. See "Development of a Novel Flow Metering System Using Ultrasonic Velocity Profile Measurement" by M. Mori et al., Experiment in Fluids, 2001, Springer-Vriag (also incorporated herein by this reference). According to that paper each clamp-on transducer pair is located along a diameter path. When, however, the properties of the fluid in the conduit are not known, transducer pairs located on diameter paths can only provide limited information and therefore inaccurate results for the mean flow rate.

SUMMARY OF THE INVENTION

Embodiments of this invention provide a flow meter capable of detecting the mean flow rate with accuracy using less than four transducer pairs. The transducers employed may be standard lower cost wetted transducers, although the invention is not so limited. Also, various embodiments either do not add significant cost or complexity, do not disrupt the flow to any great extent, and/or are capable of advantageously utilizing transducer pairs located on one or more chordal paths, to more accurately determine the mean flow rate especially when the flow properties are unknown.

In one aspect, the applicants' flow meter determines a three-dimensional flow profile and a mean flow rate by utilizing transducer pairs located on chordal paths and diameter paths through the conduit. In one non-limiting example, a transducer may act as a receiver of scattered energy from its own or a neighboring transducer's transmitted sound wave through the flow, and can generate both a transit time signal and a range gated Doppler signal. The number of transducers required can be reduced to less than currently used while at least maintaining, and typically increasing, the accuracy of information provided regarding flow velocity and flow rate through a conduit.

The invention embodiments, however, need not achieve all these results and the claims hereof should not be limited to structures or methods capable of achieving these results.

This invention features an ultrasonic flow meter system including transducers arranged with respect to a conduit to define at least one chordal path through fluid flowing in the conduit, and at least one transmitting transducer and receiving transducer pair on the chordal path for generating a transit time signal. At least one receiving transducer is positioned to receive scattered energy to generate a range gated Doppler signal. The system also includes a processing subsystem for exciting the at least one transmitting transducer and responsive to the transit time signal and the range gated Doppler signal and configured to generate a velocity profile and a mean velocity of the fluid flowing in the conduit. In one embodiment there are at least three transmitting and receiving transducer pairs. Two of the pairs may be located on chordal paths, and one of the pairs is on a diameter path. Each transducer may be positioned to receive scattered energy. The processing subsystem is typically configured to process the range gated Doppler signal from each receiving transducer after each transmitting transducer is excited. There may be multiple transmitting and receiving transducer pairs each located on a chordal path for generating transit time signals, the receiving transducer of each pair also receiving scattered energy to develop a range gated Doppler signal. In one configuration there may be two pairs of transducers located on different chordal paths and one pair located on a diameter path. Each transducer may receive scattered energy from the transit time signal that transducer generates, and/or each transducer may receive scattered energy from the transit time signal a different transducer generates. In one variation, each transducer may be a wetted transducer. In one configuration the receiving transducers output transit time and Doppler shift signals to the processing subsystem.

In one embodiment, the processing subsystem is configured to measure transit time of the transit time signal and determine a sound speed of the fluid, and to calculate average velocity of the fluid along at least one transit time path using the measured transit time and the sound speed. The average velocity of the fluid may be calculated using the measured transit time and the sound speed. The processing subsystem may be further configured to determine point locations in the fluid where point velocities are to be measured, and the point locations may be determined by using the sound speed. In one example the processing subsystem is configured to measure Doppler shift to compute velocity at the point locations, and generate a velocity profile from the velocities at the point locations. The velocity profile may be a three-dimensional velocity profile. The processing subsystem may also be configured to correct the average velocity of the fluid along the at least one transit time path to determine mean flow rate, and may do so using the velocity profile. The system may further include means for displaying the mean flow rate, and/or means for displaying the sound speed of the fluid.

This invention also features an ultrasonic flow meter system including two transmitting transducer and receiving transducer pairs arranged with respect to a conduit to define two chordal paths through fluid flowing in the conduit, and at least one transmitting transducer and receiving transducer pair arranged on the conduit to define a diameter path and for generating a transit time signal. At least one of the receiving transducers is positioned to receive scattered energy to generate a range gated Doppler signal. A processing subsystem excites the transmitting transducer and is responsive to the transit time signal and the range gated Doppler signal. In one embodiment, the processing subsystem is configured to measure transit time of the transit time signal and determine a sound speed of the fluid, and calculate average velocity of the fluid along at least one transit time path using the measured transit time and the sound speed. The processing subsystem is further configured to determine point locations in the fluid where point velocities are to be measured, measure Doppler shift to compute velocity at the point locations, generate a velocity profile from the velocities at the point locations, and correct the average velocity of the fluid along the at least one transit time path to determine mean flow rate. The average velocity of the fluid may be calculated using the measured transit time and sound speed, and the point locations may be determined using the sound speed. The average velocity of the fluid along the at least one transit time path may be corrected using the velocity profile. The velocity profile may be a three-dimensional profile.

This invention further features an ultrasonic flow meter method including arranging transducers with respect to a conduit to define at least one chordal path through fluid flowing in the conduit, generating a transit time signal from at least one transmitting transducer and receiving transducer pair on the chordal path, and generating a range gated Doppler signal from at least one receiving transducer positioned to receive scattered energy. The method further includes exciting the transmitting transducer, and generating a velocity profile and a mean velocity of the fluid flowing in the conduit from the transit time signal and the range gated Doppler signal. In one configuration, there are at least three transmitting and receiving transducer pairs, two of the pairs are located on chordal paths, and one of the pairs is on a diameter path. Each transducer may be positioned to receive scattered energy. The method may further include processing the range gated Doppler signal from each receiving transducer after each transmitting transducer is excited. There may be multiple transmitting and receiving transducer pairs each located on a chordal path for generating transit time signals, the receiving transducer of each pair also receiving scattered energy to develop a range gated Doppler signal. In one variation, there are two pairs of transducers located on different chordal paths and one pair located on a diameter path, and each transducer may receive scattered energy from the transit time signal that transducer generates, and/or each transducer may receive scattered energy from the transit time signal a different transducer generates. Each transducer may be a wetted transducer. In one configuration, the receiving transducers output transit time and Doppler shift signals.

In one embodiment, the method includes measuring transit time of the transit time signal and determining a sound speed of the fluid, and calculating average velocity of the fluid along at least one transit time path, and the average velocity of the fluid may be calculated using the measured transit time and the sound speed. The method also typically includes determining point locations in the fluid where point velocities are to be measured, and this determination may be made by using the sound speed. Doppler shift is measured to compute velocity at the point locations, and a velocity profile is generated from the velocities at the point locations. The velocity profile may be a three-dimensional velocity profile. In one variation, the method includes correcting the average velocity of the fluid along the at least one transit time path and determining mean flow rate using the velocity profile. There may also be means for displaying the mean flow rate and/or the sound speed of the fluid.

This invention also features an ultrasonic flow meter method including arranging two transmitting transducer and receiving transducer pairs with respect to a conduit to define two chordal paths through fluid flowing in the conduit, arranging at least one transmitting transducer and receiving transducer pair on the conduit to define a diameter path and for generating a transit time signal, positioning at least one of the receiving transducers to receive scattered energy to generate a range gated Doppler signal, and exciting the at least one transmitting transducer. In one embodiment the method further includes measuring transit time of the transit time signal and determining a sound speed of the fluid, calculating average velocity of the fluid along at least one transit time path using the measured transit time and the sound speed, and determining point locations in the fluid where point velocities are to be measured. The method also includes measuring Doppler shift from the range gated Doppler signal to compute velocity at the point locations, generating a velocity profile from the velocities at the point locations, and correcting the average velocity of the fluid along the at least one transit time path and determining mean flow rate. The method may include calculating the average velocity of the fluid using the measured transit time and sound speed, and determining the point locations using the sound speed. The method may further include correcting the average velocity of the fluid along the at least one transit time path using the velocity profile. The velocity profile is a three-dimensional profile.

BRIEF DESCRIPTION OF THE SEVERAL VIEWS OF THE DRAWINGS

Other objects, features and advantages will occur to those skilled in the art from the following description and the accompanying drawings, in which:

FIG. 2A is a schematic side view of one embodiment of a flow meter system in accordance with the present invention;

FIG. 2B is a schematic cross-sectional view of the flow meter system of FIG. 2A;

DETAILED DESCRIPTION OF THE INVENTION

Figure 1A:
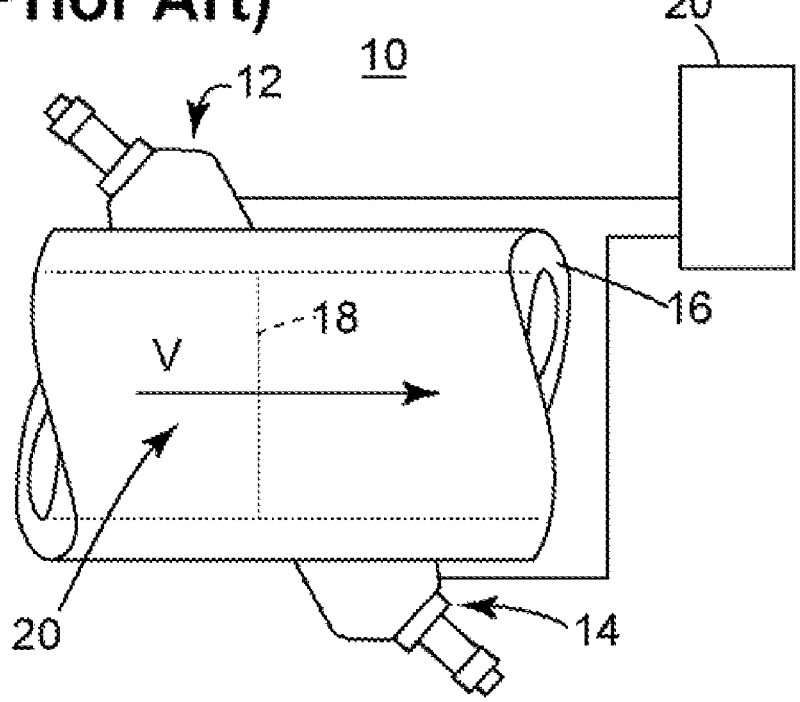
FIG. 1A is a schematic side view of a typical prior art clamp on ultrasonic transit time flow meter system.

Aside from the embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. The claims hereof are not to be limited to the embodiments described herein. Moreover, the claims hereof are not to be read restrictively unless there is clear and convincing evidence manifesting a certain exclusion, restriction, or disclaimer.

One typical prior art flow meter 10, FIG. 1A includes a transducer pair 12, 14 with upstream ultrasonic transducer 12 and downstream ultrasonic transducer 14. Ultrasonic transducers 12 and 14 may be clamp on transducers, or wetted transducers, placed on opposite sides of conduit 16, or the transducers may be on the same side of conduit 16 (not shown). Transducer 12 sends a signal 18 through the flow medium 20 (i.e. liquid and/or gas or multi-phase flow) within conduit 16 to be received by transducer 14. Transducer 14 also sends a signal through the flow in conduit 16 to be received by transducer 12. The difference in the transit time between the two signals is calculated by flow meter 20 as is the resulting flow rate of the fluid within conduit 16.

Figure 1B:
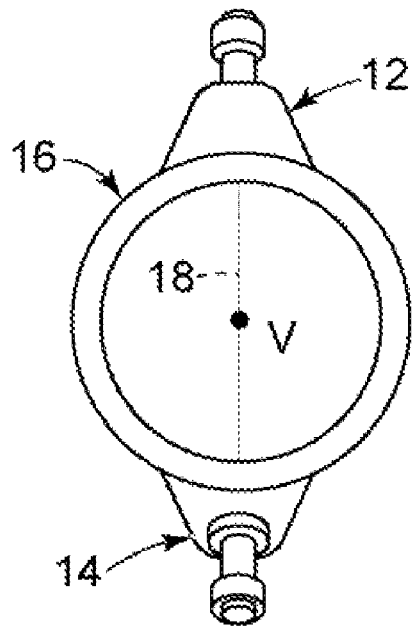
FIG. 1B is a schematic cross-sectional view of the prior art clamp on ultrasonic transit time flow meter system of FIG. 1A.

As explained in the Background section above, in the typical transit time measurement system, signal 18 is along a diameter or diametral path, i.e. signal 18, FIG. 1B passes through the center of conduit 16 along its diameter. Also, since one path 18 alone is not usually sufficient to obtain high accuracy measurements, four or more signal paths from four or more transducer pairs (not shown) are employed in an attempt to obtain a more accurate average flow velocity V. While many multiple transducer and multiple path systems are known, one such example is described in U.S. Pat. No. 6,732,595 which is incorporated herein by reference. U.S. Pat. No. 6,732,595 teaches the use of multiple paths in multiple quadrature planes through the fluid for transit time measurements.

Where a flow medium includes scatterers such as small bubbles, particles or entrained matter, or other inhomogeneities, the scatterers may be assumed to flow at the flow velocity. In such cases, measurement of the Doppler shift of a transmitted ultrasonic wave signal can provide information about the fluid flow velocity. With Doppler shift measurements, there is a known window of time during which an ultrasound signal back scattered off of a scatterer—which is located at a certain location in the fluid flow in the conduit—should return to the receiving transducer. During that time window a Doppler shift, i.e. a change in ultrasonic frequency, is detected. When such measurements are made at a number of predetermined points in the conduit, this is known as range gating.

One such method of Doppler shift measurement is shown in U.S. Pat. No. 4,787,252 which is incorporated herein by reference. In the system of U.S. Pat. No. 4,787,252, frequency shifts in backscatter signals from scatterers (bubbles, particles or entrained matter) along diameter paths at different radial points in the pipe are used to derive the velocities at those radial points, which are averaged using some predetermined weighting factor to create a flow profile.

In general, as the number of transmitting transducer and receiving transducer pairs increases, so does the cost of the system. Conversely, transducers which can both transmit and receive 180° back scattering ultrasonic signals may be used in an effort to decrease the number of transducer pairs. By virtue of the nature of their complexity, however, such transducers are less sensitive or more costly. Also as noted above, if any of the transducer pairs are wetted, i.e. come into contact with the flow, disruption to the flow caused by the transducers themselves can offset some of the increase in accuracy obtained by using multiple transducer pairs.

The various embodiments of the subject invention utilize a combination of different types, number, and placement of transducers to achieve cost savings and increase accuracy.

In one aspect of the invention, ultrasonic flow meter system and method 100, FIGS. 2A and 2B, includes transducers 102, 104 arranged with respect to conduit 120 to define chordal path 122 between the transducers. Transmitting transducer 102 and receiving transducer 104 pair generate a transit time signal as is known in the art. The transit time signal is output to processing system or subsystem 126. Typically flow velocity measurement using transit time includes a user entering appropriate information into flow meter 124 such as flow medium type, meter factor, transducer type and spacing, conduit diameter and the like, although these are not necessary limitations of the invention. The transit time is representative of the time of flight required for the transmitted ultrasonic signals traversing conduct 120 through flow F to travel from one transducer directly to a receiving transducer.

Processing subsystem 126, which may include a controller, controls the ultrasonic pulses sent from the transducers through flow F, and is configured to excite transmitting transducer 102 to transmit a pulsed signal to measure the time of flight along chordal path 122. The configuration of processing subsystem 126 is such that it also excites transmitting transducer 102 to transmit range gated Doppler signals for each of a plurality of depth points R in the flow F in conduit 120.

In the embodiment of FIGS. 2A and 2B, transducer 102 acts as both a transmitter of an ultrasonic signal for transit time velocity measurement, and a receiver positioned to receive scattered energy 130 to generate a range gated Doppler or Doppler shift signal. The Doppler shift signals are output to processing subsystem 126. Scattered energy 130 is back scattering from scatterers such as bubbles, particles, or other entrained matter or inhomogeneities in the flow F in conduit 120, from various points R along ultrasonic signal path 122. Frequency shifts in the back scattered ultrasonic waves received by transducer 102 can be processed. As discussed above, there is a known window of time it should take for an ultrasonic signal back scattered off of entrained particles located at various points R in the conduit to return to receiving transducer 102. During that time window a Doppler shift, i.e. a change in frequency in the signal at those various predetermined points R, is detected, which is known as range gating. Such range gated Doppler signals are generated by transducer 102 in its capacity as a receiver of back scattering energy, from as many points R as desired. As shown in FIGS. 2A and 2B, transducer 102 receives scattered energy 130 which is back scattered approximately 180°. Also, as shown the transducers are on the opposite sides of the conduit. This is not a necessary limitation and for either transit time or range gated Doppler measurements transducers may be located on the same side of the pipe or conduit.

Processing subsystem 126 is also configured to be responsive to the transit time signal and the range gated Doppler signal. Typically, processing subsystem 126 is configured to process the range gated Doppler signal from each receiving transducer after each transmitting transducer is excited. In each embodiment described herein the transducers are connected to flow meter 124.

Accordingly, transit time signals are generated in order to calculate velocity in accordance with transit time methods, but with one pair of transducers on a chordal—not diameter—path. Doppler shift information is also obtained, and combined with transit time information, can increase the accuracy of flow velocity measurements with a minimal number of transducers. As discussed more fully below, from the transit time signal and range gated Doppler signal information, processing subsystem 126 is further configured to generate a velocity profile of flow F in conduit 120 and to output for the user flow data including a mean flow rate of the fluid flowing in the conduit, which is typically output via display 128.

Figure 3:
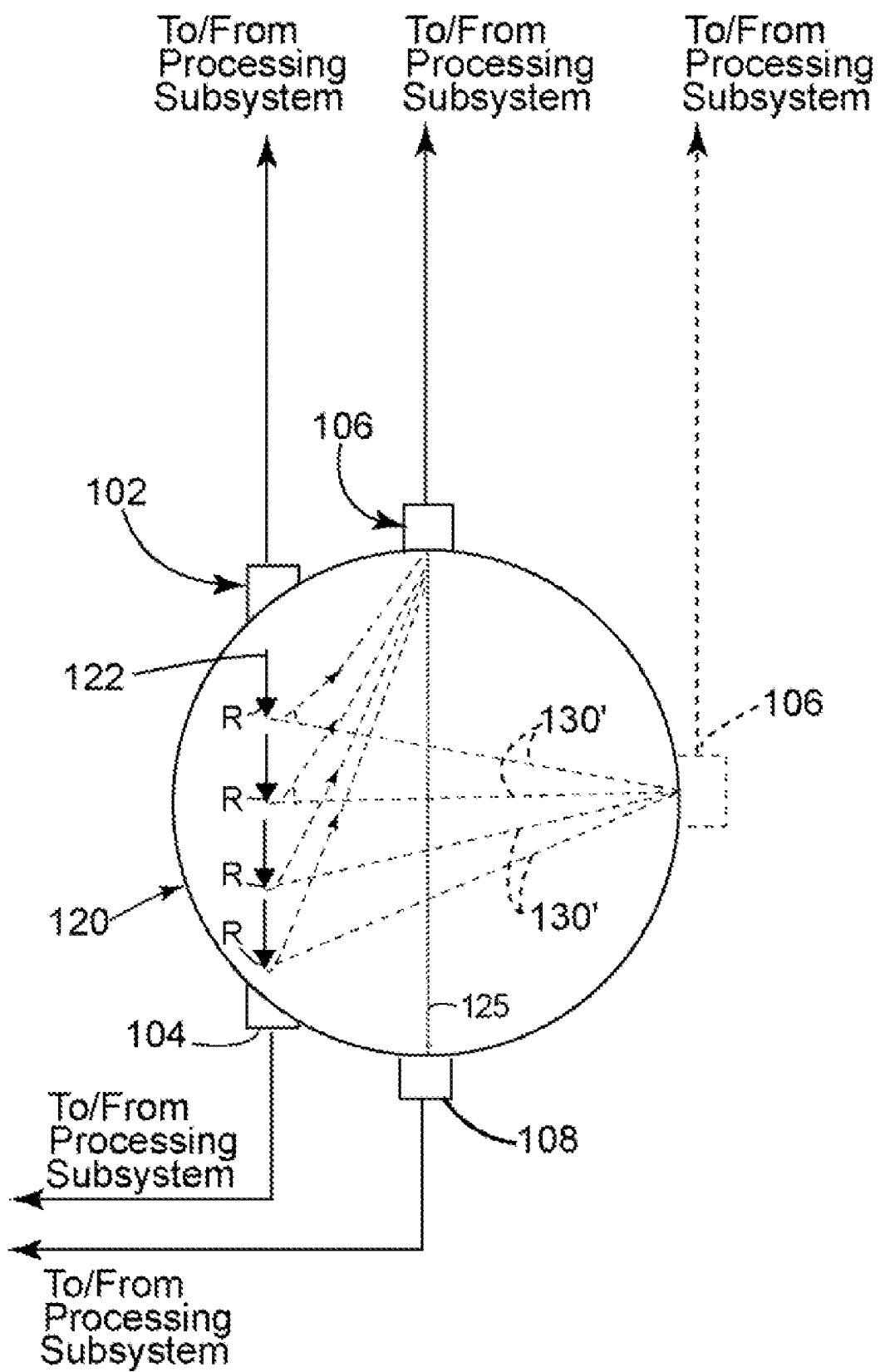
FIG. 3 is a schematic cross-sectional view of embodiments of the flow meter of the present invention including at least one chordal path.

In another embodiment, additional transducers or transducer paths may take the place of more highly developed transducers. As shown in FIG. 3, transducer 106 is a receiving transducer configured to receive scattered energy 130. Transducers 102 and 104 operate similarly to the first embodiment, except that transducer 102 need not be configured to receive 180° back scattered energy, and thus may be less complex and less expensive. Unlike the embodiment of FIG. 2B, scattered energy 130 is not scattered at 180°, but some other angle depending on the location of points R. As with all embodiments, there may be any number of points R from which scattered energy may be received, and thus any number of angles, as desired for a particular application. Notably also, in one example transducer 106 may be placed at another location (shown in phantom) to receive scattered energy 130' from different angles. In a further example, transducer 108 may be added to provide a second transit time path 125, where transducers 106, 108 are configured as another transmitter/receiver pair to generate a second transit time signal. As used herein, transit time path—which may be a chordal path or a diameter path as desired for a particular application—is defined as a straight line path through the fluid flowing in the conduit between a transmitting transducer and a receiving transducer. As shown, transit time path 125 is a diameter path. Thus, various embodiments can provide flexibility regarding the types, number, and location of transducers as desired for a particular application.

Figure 4:
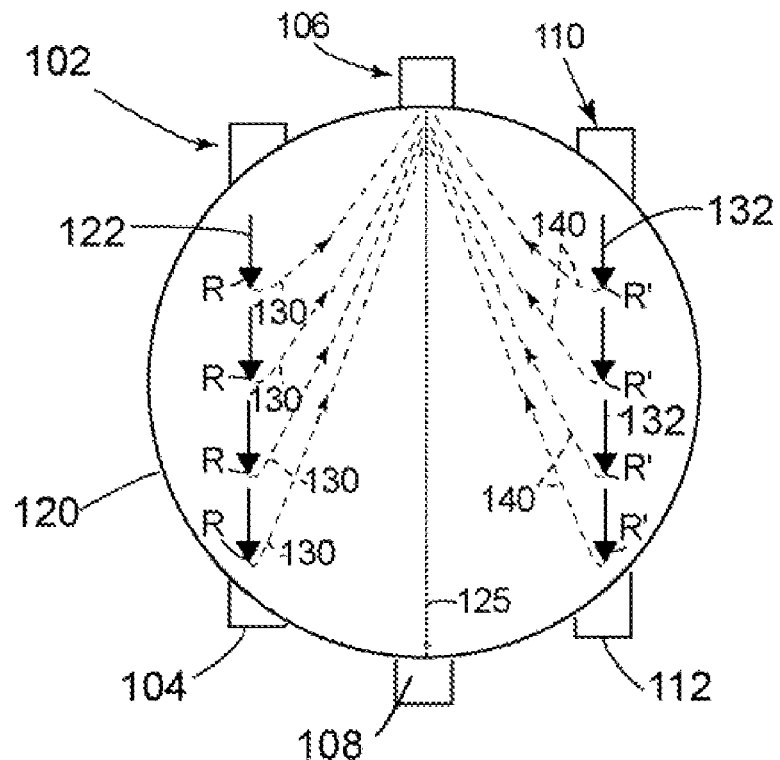
FIG. 4 is a schematic cross-sectional view of an embodiment of the flow meter of the present invention showing three transducer pairs and two chordal paths.
Figure 5:
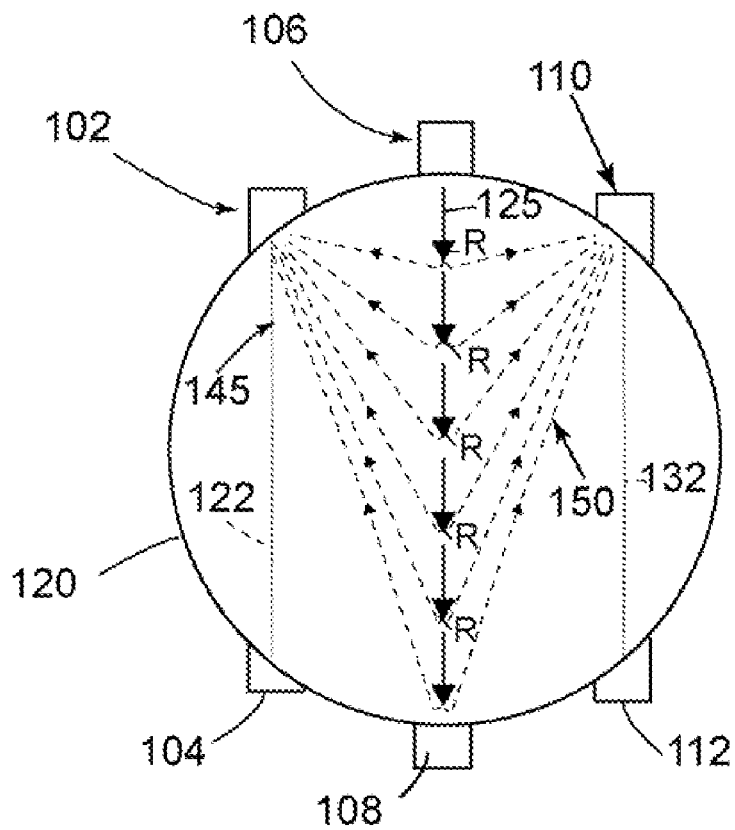
FIG. 5 is a schematic cross-sectional view of a further embodiment of the flow meter of the present invention showing three transducer pairs in another configuration.

The embodiments shown in FIGS. 4 and 5 include three transducer pairs. Transducer pair 102, 104, FIG. 4, is arranged as transmitter and receiver on chordal path 122 for generating a transit time signal which is associated with path 122. For improved information concerning flow throughout a cross-sectional area of conduit 120, transducer pair 110, 112 is also arranged as transmitter and receiver on chordal path 132 and to generate a transit time signal associated with path 132. Transducer 106 on diameter path 125 is arranged as a receiver positioned to receive scattered energy 130. Although from the figures it appears that all transducer pairs are parallel to one another, this is not necessary, and transducer pairs may be spaced along conduit 120 relative to one another. Also for improved information concerning flow throughout a cross-sectional area of conduit 120, receiving transducer 106 can receive back scattering energy 140 from points R' along chordal path 132. All transducers 102, 104, 106, 108, 110, 112 connect with the processing subsystem such as processing subsystem 126, FIG. 2A, which is configured to excite transmitting transducers and to receive the transit time and range gated Doppler signals, as well as to generate a velocity profile and mean flow rate for the fluid as discussed herein.

In the embodiment of FIG. 5, transducer 106 is configured to transmit an ultrasonic signal on diametral path 125 to measure transit time, and alternately to generate range gated Doppler signals. Transducer 102 is configured to receive back scattering energy 145, and transducer 110 is configured to receive back scattering energy 150. In one variation, transducers 102 and 110 may be configured to alternately transmit and receive ultrasonic signals along chordal paths 122 and 132 respectively, with transducers 104 and 112 serving to complete the respective transducer pairs along these chordal paths.

Figure 6:
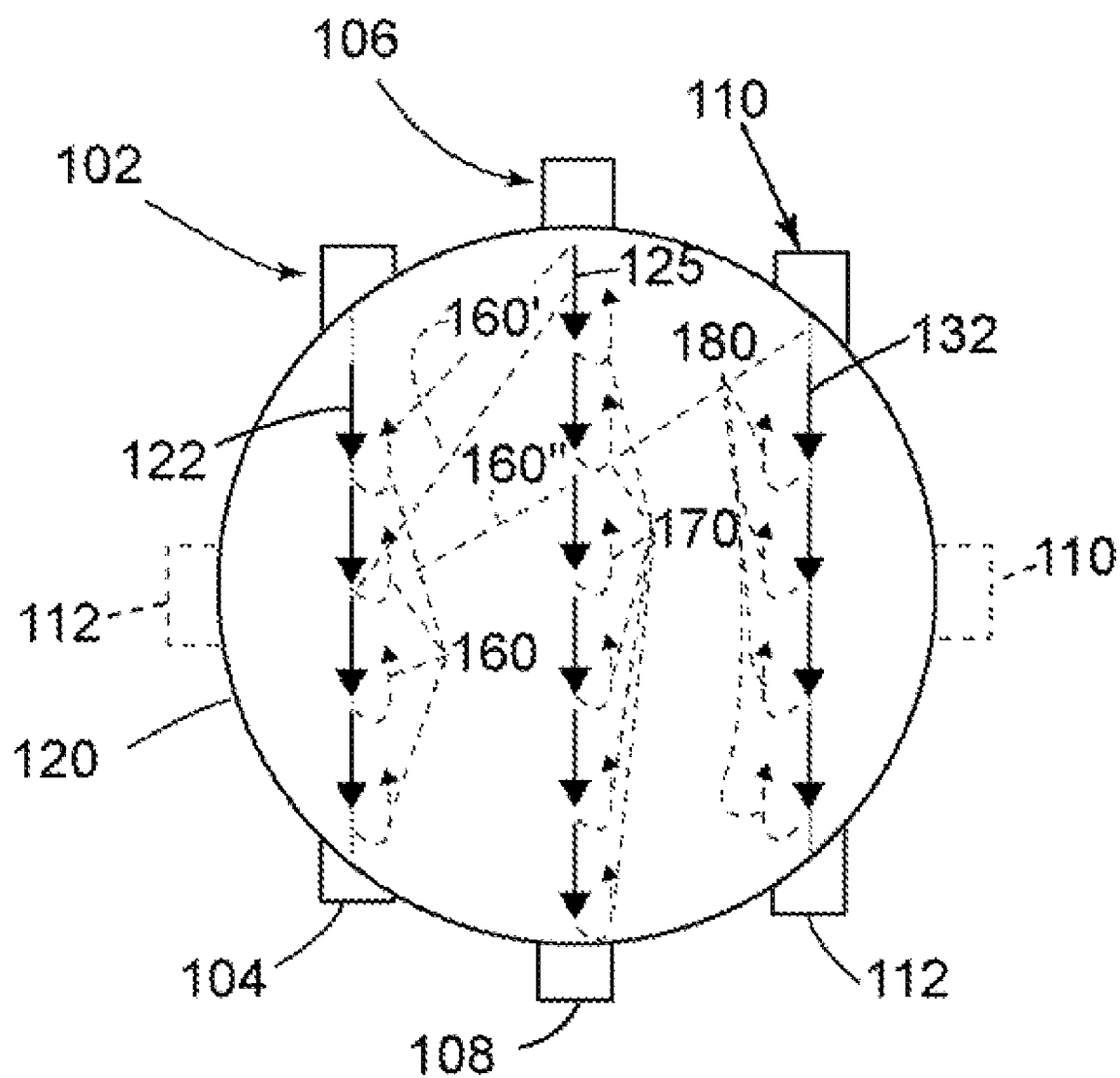
FIG. 6 is a schematic cross-sectional view of embodiments of the flow meter of the present invention showing further configurations of three transducer pairs.

As shown in FIG. 6, each transducer 102, 106, 110 can be configured as a transmitter/receiver for transit time measurement and for Doppler Shift measurement. In this example, each transducer 102, 106 and 1 10 transmit and receive transit time signals as well as transmit range gated Doppler signals and receive scattered energy. As shown, scattered energy 160, 170, 180 is reflected back to transducers 102, 106, 110, respectively, at approximately 180°.

As with all embodiments, however, each transducer such as transducers 102, 106, 110 may be positioned to received scattered energy from a different path. In one example, transducers 106, 110 receive scattered energy 160', 160", respectively, at angles other than 180°. In another example, transducer pair 110, 112 may be positioned as shown in phantom, to receive scattered energy 160' at reflection angles which include 90° (not shown). In a further embodiment, transducers 104, 108 and 112 are also configured as transmitters and receivers of transit time signals and as transmitters of range gated Doppler signals, as well as receivers of scattered energy.

Notably, various transducer configurations and arrangements may also be used to take measurements at different locations when ultrasonic signal strength is weak and/or for redundancy to check measurements.

Moreover, in some embodiments receiving transducers may receive scattered energy from a transit time signal generated along a path that a different transducer pair generates. For example, transducer 106, FIG. 4 receives scattered energy 130 from the transit time signal generated by transducer 102 along path 122. This is not necessarily the case, however. In alternative embodiments, receiving transducers may receive back scattering energy from the transit time signal it generates itself. In one example, transducer 102, FIG. 6 receives back scattering energy 170 which transit time signal transducer 102 itself generates along path 125. These are not limiting examples, however, and transducer arrangements other than these examples may be used in various other embodiments.

Further, although it is not shown in the figures, it is apparent that there may be multiple transmitting and receiving transducer pairs each located on a chordal path—not just two transducer pairs—for generating transit time signals, the receiving transducer of each pair also receiving scattered energy to develop a range gated Doppler signal. This may be accomplished by adding transducer pairs as desired.

Additionally, in any embodiment one or more transducers may be wetted. In the case of non-wetted transducers, some modification to the conduit exterior is generally necessary in order to transmit the ultrasonic signal on a chordal path, and known modification techniques can be used.

Especially with the use of three paths, where one or two of the three paths are chordal paths, the combination of transit time and range gated scattered Doppler signals provides a mapping of the conduit flow profile throughout the conduit cross-section.

As discussed above, processing subsystem 126, FIG. 2A in flow meter 124 controls the transducers and responds to the information output by the receiving transducers after the transducers have received transit time signals and received back scatter signals. Also as discussed above, processing subsystem 126 is configured differently depending on the types, locations, and number of transducers. In each case, processing subsystem 126 is configured to combine information concerning transit time and Doppler shift to generate a velocity profile and create a three-dimensional flow profile. In one example, the receiving transducers output transit time signals and Doppler signals to the processing subsystem. The Doppler signals include Doppler shifts in frequency of ultrasonic signals at various points in the conduit. Processing subsystem 126 is configured to be responsive to the transit time signals and Doppler signals output from the receiving transducers, and processing subsystem 126 is further configured to generate a velocity profile and create a three-dimensional flow profile therefrom.

Figure 7:
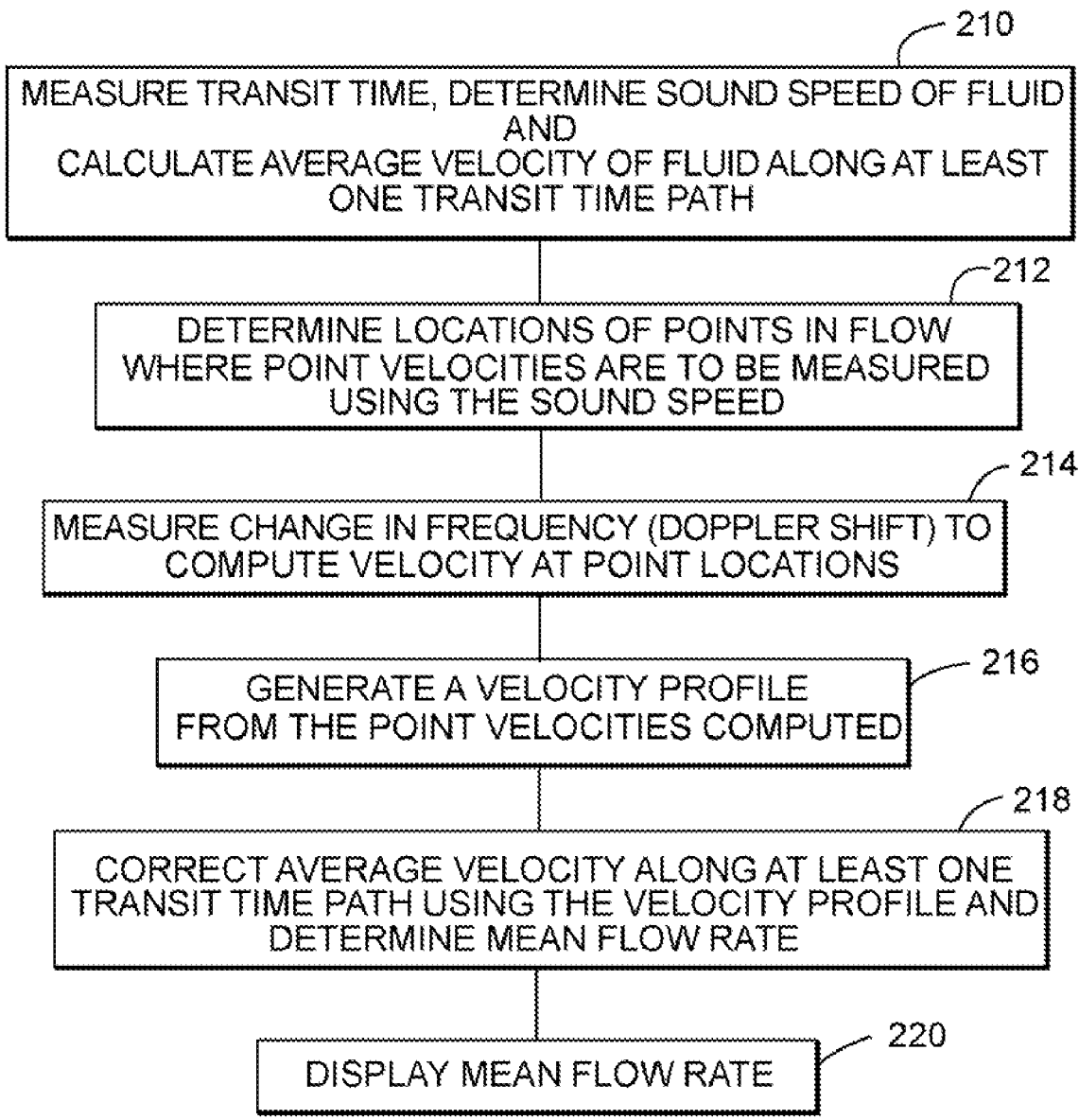
FIG. 7 is a flowchart depicting the primary processing steps of one embodiment of a processing subsystem for generating a velocity profile and mean flow rate from transit time and Doppler shift data.

In accordance with one aspect of the system and method of the subject invention, processing subsystem 126 is configured as shown in FIG. 7. Processing subsystem 126, FIG. 2A is configured to measure transit time of the transit time signal and to determine the sound speed of the fluid in the conduit, which can be determined from the transit time, as well as calculate the average velocity of the fluid along transit time paths using the transit time and sound speed, step 210, FIG. 7. In one example, with the transducer configuration of FIG. 5, the average velocity of the fluid along transit time path 125 is calculated, as well as the sound speed of the fluid. The measurements, determinations and calculations of this step may be performed as discussed above and/or by systems and methods known in the art. As noted, however, the systems and methods of the subject invention are not limited, and the average velocity along a transit time path may be along a chordal or diameter path.

Additionally, processing subsystem 126 is configured to determine the locations of points in the flow where point velocities are to be measured using the sound speed, step 212, FIG. 7. As discussed above, frequency shifts in the back scattered ultrasonic waves received by the transducers can be determined. Therefore, processing system 126 is configured to measure changes in frequency—i.e. Doppler shift—and to compute the velocity at various point locations utilizing the changes in frequency, step 214. Again using the example of FIG. 5, locations R can be determined, as well as changes in frequency, i.e. Doppler shifts, for each or various point locations R. From the point velocities computed, a velocity profile is generated, step 216, FIG. 7. The velocity profile generated is typically a three-dimensional velocity profile, determined by the data acquisition configuration. For example, the geometrical relationship between the transmitting transducer, the receiving transducer, and position of the scatter determines a scattering vector. The measured Doppler shifts along the direction of the scattering vector can be decomposed into a pipe or conduit axial component and transverse components, corresponding to axial and transverse velocity of the scatter. For example, in FIG. 5, transducers 102 and 110 are symmetrically located with respect to transducer 106. The observed Doppler shifts received by transducers 102 and 110 caused by axial velocity of the same scatterers should be virtually identical. Any observed difference is an indication that a transverse velocity component is present in the fluid in the conduit. The axial velocity component may be isolated using known means if that is the only velocity component of interest.

In one variation in accordance with the subject invention, the average velocity along the transit time paths is corrected using the velocity profile generated, and the mean flow rate is determined therefrom, step 218. In this way, the average velocity is corrected dynamically rather than by a predetermined analytical or empirical correction factor. As a consequence, the mean flow rate is more accurately determined. Thereafter, the mean flow rate and/or sound speed of the fluid may be displayed to the user, step 220.

The example of FIG. 5 is not limiting, and the systems and methods of subject invention may be utilized with any desired transducer configurations. In addition, various parts or portions of the systems, subsystems, processing subsystem and/or methods of the subject invention may be embedded in software as may be known to those skilled in the art, and/or may be part of a computer or other processor which may be separate from the remaining systems. For example, the processing subsystem can include all the subsystems and methods and the like as described herein including processor and memory requirements for a complete system. These examples are not meant to be limiting, and various parts or portions of the present invention may be implemented in a computer such as a digital computer, and/or incorporated in software module(s) and/or computer programs compatible with and/or embedded in computers or other conventional devices, and the computer's or device's main components may include e.g.: a processor or central processing unit (CPU), at least one input/output (I/O) device (such as a keyboard, a mouse, a compact disk (CD) drive, and the like), a controller, a display device, a storage device capable of reading and/or writing computer readable code, and a memory, all of which are interconnected, e.g., by a communications network or a bus. The systems, subsystems, and/or methods of the present invention can be implemented as a computer and/or software program(s) stored on a computer readable medium in the computer or meter and/or on a computer readable medium such as a tape or compact disk. The systems, subsystems, and/or methods of the present invention can also be implemented in a plurality of computers or devices, with the components residing in close physical proximity or distributed over a large geographic region and connected by a communications network, for example.

The velocity profile obtained in accordance with various embodiments of the invention is much more accurate than previously known profiles along a diameter path only. Consequently, the flow profile and flow rate obtained are much more accurate.

Accordingly, the various embodiments of the invention combine transit time flow measurement with range-gated Doppler measurement using chordal paths to generate a more accurate flow profile and flow rate. The transit time measures the time of flight of ultrasonic signal pulses. The range-gated Doppler measures back scattering of objects or scatterers moving in the flow stream. Greater accuracy can be obtained with a minimal number of transducers and transducer paths while minimizing transducer complexity, and various combinations of transducers and paths can provide more options for the user. Further, the combination of transit time measurements and range-gated Doppler allows for dynamic corrections of velocity and flow rate and offers a more precise results than conventional systems.

Moreover, the flow profile obtained not only can be used to obtain more accurate flow rates, but may serve other uses as well. The system and method of the invention embodiments can be used to monitor changes to the interior of a conduit or pipe over time by comparing pipe profiles at different points in time. Thus, changes in the condition of a pipe can be learned non-invasively, and facilitate decisions regarding replacement or repair before a catastrophic or emergency situation arises. Also, changes in types of fluid flowing in a conduit can be monitored, as well as multi-phase flows.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An ultrasonic flow meter system comprising:
   transducers arranged with respect to a conduit to define at least one chordal path through fluid flowing in the conduit;
   at least one transmitting transducer and receiving transducer pair on the chordal path for generating a transit time signal;
   at least one receiving transducer positioned to receive scattered energy from any angle from point locations in the fluid to generate a range gated Doppler signal;
   a processing subsystem for exciting the at least one transmitting transducer and responsive to the transit time signal and the range gated Doppler signal and configured to generate a velocity profile and a mean velocity of the fluid flowing in the conduit;
   in which the receiving transducers output transit time and Doppler shift signals to the processing subsystem;
   in which the processing subsystem is configured to:
      measure transit times of the transit time signals and determine a sound speed of the fluid;
      calculate average velocity of the fluid along at least one transit time path using the measured transit times and the sound speed;
      determine point locations in the fluid and measure point velocities at the point locations; and
      in which the point locations are predetermined by using the sound speed.

2. The system of claim 1 in which the processing subsystem is configured to measure Doppler shift to compute velocity at the point locations.

3. The system of claim 2 in which the processing subsystem is configured to generate a velocity profile from the velocities at the point locations.

4. The system of claim 3 in which the velocity profile is a three-dimensional velocity profile.

5. The system of claim 3 in which the processing subsystem is configured to correct the average velocity of the fluid along the at least one transit time path to determine mean flow rate.

6. The system of claim 5 in which the processing subsystem is configured to correct the average velocity of the fluid along the at least one transit time path using the velocity profile.

7. The system of claim 5 further including means for displaying the mean flow rate.

8. An ultrasonic flow meter system comprising:
   two transmitting transducer and receiving transducer pairs arranged with respect to a conduit to define two chordal paths through fluid flowing in the conduit;
   at least one transmitting transducer and receiving transducer pair arranged on the conduit to define a diameter path and for generating a transit time signal;
   at least one receiving transducer positioned to receive scattered energy from any angle from point locations in the fluid to generate a range gated Doppler signal;
   a processing subsystem for exciting the transmitting transducer and responsive to the transit time signal and the range gated Doppler signal;
   said processing subsystem being configured to:
   measure transit time of the transit time signal and determine a sound speed of the fluid;
   calculate average velocity of the fluid along at least one transit time path using the measured transit time and the sound speed;
   predetermine the point locations in the fluid and measure point velocities at the point locations;
   measure Doppler shift to compute velocity at the point locations;
   generate a velocity profile from the velocities at the point locations; and
   correct the average velocity of the fluid along the at least one transit time path to determine mean flow rate.

9. The system of claim 8 in which the average velocity of the fluid is calculated using the measured transit time and sound speed.

10. The system of claim 8 in which the point locations are determined using the sound speed.

11. The system of claim 8 in which the average velocity of the fluid along the at least one transit time path is corrected using the velocity profile.

12. The system of claim 8 in which the velocity profile is a three-dimensional profile.

13. An ultrasonic flow meter method comprising:
   arranging transducers with respect to a conduit to define at least one chordal path through fluid flowing in the conduit;
   generating a transit time signal from at least one transmitting transducer and receiving transducer pair on the chordal path;

generating a range gated Doppler signal from at least one receiving transducer positioned to receive scattered energy from any angle from point locations in the fluid;

exciting the transmitting transducer;

generating a velocity profile and a mean velocity of the fluid flowing in the conduit from the transit time signal and the range gated Doppler signal;

in which the receiving transducers output transit time and Doppler shift signals;

measuring transit time of the transit time signal and determining a sound speed of the fluid;

calculating average velocity of the fluid along at least one transit time path;

calculating the average velocity of the fluid using the measured transit time and the sound speed;

determining point locations in the fluid and measuring point velocities at the point locations; and predetermining the point locations by using the sound speed.

14. The method of claim 13 including measuring Doppler shift to compute velocity at the point locations.

15. The method of claim 14 including generating a velocity profile from the velocities at the point locations.

16. The method of claim 15 in which the velocity profile is a three-dimensional velocity profile.

17. The method of claim 15 including correcting the average velocity of the fluid along the at least one transit time path and determining mean flow rate.

18. The method of claim 17 including correcting the average velocity of the fluid along the at least one transit time path using the velocity profile.

19. The method of claim 17 further including means for displaying the mean flow rate.

20. The method of claim 19 further including means for displaying the sound speed of the fluid.

21. An ultrasonic flow meter method comprising:

arranging two transmitting transducer and receiving transducer pairs with respect to a conduit to define two chordal paths through fluid flowing in the conduit;

arranging at least one transmitting transducer and receiving transducer pair on the conduit to define a diameter path and for generating a transit time signal;

positioning at least one of the receiving transducers to receive scattered energy from any angle from point locations in the fluid to generate a range gated Doppler signal;

exciting the at least one transmitting transducer;

measuring transit time of the transit time signal and determining a sound speed of the fluid;

calculating average velocity of the fluid along at least one transit time path using the measured transit time and the sound speed;

predetermining the point locations in the fluid and measuring point velocities at the point locations;

measuring Doppler shift from the range gated Doppler signal to compute velocity at the point locations;

generating a velocity profile from the velocities at the point locations; and correcting the average velocity of the fluid along the at least one transit time path and determining mean flow rate.

22. The method of claim 21 including calculating the average velocity of the fluid using the measured transit time and sound speed.

23. The method of claim 21 including predetermining the point locations using the sound speed.

24. The method of claim 21 including correcting the average velocity of the fluid along the at least one transit time path using the velocity profile.

25. The method of claim 21 in which the velocity profile is a three-dimensional profile.

26. An ultrasonic flow meter system comprising:

transducers arranged with respect to a conduit to define at least one chordal path through fluid flowing in the conduit;

at least one transmitting transducer on the chordal path for generating a transit time signal;

at least one receiving transducer positioned to receive scattered ultrasonic signal carrying Doppler information from any point locations in the fluid;

a processing subsystem responsive to the transit time signal and the scattered signal;

wherein the receiving transducers output transit time and the scattered Doppler shift signals to the processing subsystem;

the processing subsystem being configured to measure transit times of the transit time signals and determine a sound speed of the fluid and calculate average velocity of the fluid along at least one transit time path using the measured transit times the processing subsystem further configured to determine point locations in the fluid by using the sound speed of the fluid and perform ranged gated Doppler measurement to obtain flow profile of the conduit by measuring point velocities at the point locations;

wherein the average velocity of the fluid in the conduit is calculated using the calculated velocity and the flow profile.

27. The system of claim 26 in which the processing subsystem is configured to measure Doppler shift to compute velocity at the point locations.

28. The system of claim 27 in which the processing subsystem is configured to generate a velocity profile from the velocities at the point locations.

29. The system of claim 28 in which the velocity profile is a three-dimensional velocity profile.

30. The system of claim 28 in which the processing subsystem is configured to correct the average velocity of the fluid along the at least one transit time path to determine mean flow rate.

31. The system of claim 30 in which the processing subsystem is configured to correct the average velocity of the fluid along the at least one transit time path using the velocity profile.

32. The system of claim 30 further including means for displaying the mean flow rate.

* * * * *